(12) United States Patent
Adachi

(10) Patent No.: US 8,892,641 B2
(45) Date of Patent: *Nov. 18, 2014

(54) CONTENT DELIVERY SERVER, COMMUNICATION TERMINAL, CONTENT DELIVERY SYSTEM, CONTENT DELIVERY METHOD, CONTENT DELIVERY PROGRAM, TERMINAL CONTROL PROGRAM AND STORAGE MEDIUM CONTAINING THE PROGRAM

(71) Applicant: Yoshihisa Adachi, Kyoto (JP)

(72) Inventor: Yoshihisa Adachi, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/727,312

(22) Filed: Dec. 26, 2012

(65) Prior Publication Data

US 2013/0117360 A1    May 9, 2013

Related U.S. Application Data

(62) Division of application No. 10/899,087, filed on Jul. 27, 2004, now Pat. No. 8,364,777.

(30) Foreign Application Priority Data

Jul. 28, 2003 (JP) ................. 2003-202359
Jul. 20, 2004 (JP) ................. 2004-212222

(51) Int. Cl.
G06F 15/16 (2006.01)
H04L 29/02 (2006.01)
G06F 9/48 (2006.01)

(52) U.S. Cl.
CPC .............. *H04L 29/02* (2013.01); *G06F 9/4856* (2013.01)
USPC ............ 709/203; 709/200; 709/201; 709/204

(58) Field of Classification Search
None
See application file for complete search history.

(56) References Cited

U.S. PATENT DOCUMENTS

| 6,199,204 B1 | 3/2001 | Donohue |
| 6,282,711 B1 | 8/2001 | Halpern et al. |
| 6,493,871 B1 | 12/2002 | McGuire et al. |
| 2002/0002601 A1 | 1/2002 | Rankin et al. |
| 2002/0010755 A1 | 1/2002 | Rankin |

(Continued)

FOREIGN PATENT DOCUMENTS

| EP | 1 204 054 A2 | 5/2002 |
| EP | 1 204 054 A2 | 8/2002 |

(Continued)

OTHER PUBLICATIONS

Final Office Action dated Dec. 2, 2009 from parent U.S. Appl. No. 10/899,087.

(Continued)

*Primary Examiner* — Djenane Bayard
(74) *Attorney, Agent, or Firm* — Birch, Stewart, Kolasch & Birch, LLP

(57) ABSTRACT

There are provided a server machine and communication terminals communicatively connected to each other over a communication network. The server machine delivers software to a communication terminal. The server machine again delivers to the communication terminal delivered software which was delivered at least once to the communication terminal. Each communication terminal has an identification information transmitter section obtaining identification information by which users are identified. The server machine includes a delivery management database to manage the identification information and software delivery history information in an associated manner.

7 Claims, 10 Drawing Sheets

(56) References Cited

U.S. PATENT DOCUMENTS

| | | |
|---|---|---|
| 2002/0010756 A1 | 1/2002 | Oku |
| 2003/0005135 A1 | 1/2003 | Inoue et al. |
| 2003/0061314 A1 | 3/2003 | Wang |
| 2003/0084306 A1 | 5/2003 | Abburi et al. |
| 2003/0187801 A1 | 10/2003 | Chase et al. |
| 2003/0236895 A1 | 12/2003 | Ohkubo et al. |
| 2004/0031028 A1 | 2/2004 | Hunt et al. |
| 2004/0044775 A1 | 3/2004 | Takano et al. |
| 2004/0054920 A1 | 3/2004 | Wilson et al. |
| 2004/0127196 A1 | 7/2004 | Dabbish et al. |
| 2004/0172533 A1 | 9/2004 | DeMello et al. |
| 2005/0210458 A1 | 9/2005 | Moriyama et al. |

FOREIGN PATENT DOCUMENTS

| | | |
|---|---|---|
| JP | 7-129407 A | 5/1995 |
| JP | 11-272471 A | 10/1999 |
| JP | 11-312080 A | 11/1999 |
| JP | 2001-350727 A | 12/2001 |
| JP | 2002-092223 A | 3/2002 |
| JP | 2002-279204 A | 9/2002 |
| JP | 2002/334173(A) | 11/2002 |
| JP | 2003-67479 A | 3/2003 |
| JP | 2004-220592 A | 8/2004 |

OTHER PUBLICATIONS

Final Office Action dated Jan. 21, 2011 from parent U.S. Appl. No. 10/899,087.

Final Office Action dated Oct. 27, 2008 from parent U.S. Appl. No. 10/899,087.

Office Action dated Apr. 3, 2009 from parent U.S. Appl. No. 10/899,087.

Office Action dated Apr. 5, 2012 from parent U.S. Appl. No. 10/899,087.

Office Action dated Jul. 9, 2010 from parent U.S. Appl. No. 10/899,087.

Office Action dated May 1, 2008 from parent U.S. Appl. No. 10/899,087.

FIG. 2

| IDENTIFICATION INFORMATION | SOFTWARE DELIVERY HISTORY INFORMATION |
|---|---|
| USER A | SOFTWARE 001, SOFTWARE 002 |
| USER B | SOFTWARE 001, SOFTWARE 003, SOFTWARE 004 |
| ⋮ | ⋮ |

FIG. 6

| IDENTIFICATION INFORMATION | SOFTWARE DELIVERY HISTORY INFORMATION | REGULAR DELIVERY INFORMATION |
|---|---|---|
| USER A | SOFTWARE 001, SOFTWARE 002 | DATE AND TIME a |
| USER B | SOFTWARE 001, SOFTWARE 003, SOFTWARE 004 | DATE AND TIME b |
| ⋮ | ⋮ | |

FIG. 8

| IDENTIFICATION INFORMATION ||SOFTWARE DELIVERY HISTORY INFORMATION|
|---|---|---|
| USER INFORMATION | COMMUNICATION TERMINAL INFORMATION ||
| M | X | SOFTWARE 001(X), SOFTWARE 002(X) |
| ⋮ | ⋮ | ⋮ |

FIG.9

| IDENTIFICATION INFORMATION ||SOFTWARE DELIVERY HISTORY INFORMATION|
|---|---|---|
| USER INFORMATION | COMMUNICATION TERMINAL INFORMATION ||
| M | Y | SOFTWARE 001(Y), SOFTWARE 002(Y) |
| ⋮ | ⋮ | ⋮ |

FIG. 11

| IDENTIFICATION INFORMATION | | | SOFTWARE DELIVERY HISTORY INFORMATION |
|---|---|---|---|
| USER ID | USER INFORMA-TION | COMMUNICATION TERMINAL INFORMATION | |
| A | M | X | SOFTWARE 001(X), SOFTWARE 002(X) |
| . . | . . | . . | . . |

FIG. 12

| IDENTIFICATION INFORMATION | | | SOFTWARE DELIVERY HISTORY INFORMATION |
|---|---|---|---|
| USER ID | USER INFORMA-TION | COMMUNICATION TERMINAL INFORMATION | |
| A | N | Y | SOFTWARE 001(Y), SOFTWARE 002(Y) |
| . . | . . | . . | . . |

CONTENT DELIVERY SERVER, COMMUNICATION TERMINAL, CONTENT DELIVERY SYSTEM, CONTENT DELIVERY METHOD, CONTENT DELIVERY PROGRAM, TERMINAL CONTROL PROGRAM AND STORAGE MEDIUM CONTAINING THE PROGRAM

This application is a Divisional of co-pending U.S. patent application Ser. No. 10/899,087 filed Jul. 27, 2004, which Non-provisional application claims priority under 35 U.S.C. §119(a) on Patent Applications No. 2003-202359 filed in Japan on Jul. 28, 2003 and No. 2004-212222 filed in Japan on Jul. 20, 2004, the entire contents of which are hereby incorporated by reference.

FIELD OF THE INVENTION

The present invention relates to a content delivery server, a communication terminal, a content delivery system, a content delivery method, a content delivery program, a terminal control program, and a storage medium containing such programs, in the field of delivering content from a content delivery server to a communication terminal connected to a communication network (hereinafter, "network").

BACKGROUND OF THE INVENTION

Conventionally, users install software, for example, from a CD-ROM or like storage medium or over the Internet, (hereinafter, "original software" which is a type of content) on their computers (communication terminals). Thereafter, every time the user needs a software update, he obtains a patch or updater (updater software) from, for example, the original software distributor's home page, over a network to correct the original software.

To facilitate the action, systems exist which automatically deliver updater software information to the communication terminal from the software provider's server machine over the network. Technology related to the system is disclosed in, for example, Japanese unexamined patent application 11-272471 (Tokukaihei 11-272471/1999; published on Oct. 8, 1999), Japanese unexamined patent application 11-312080 (Tokukaihei 11-312080/1999; published on Nov. 9, 1999), and Japanese unexamined patent application 7-129407 (Tokukaihei 7-129407/1995; published on May 19, 1995).

Tokukaihei 11-272471/1999 discloses a remote software installation technique where software is distributed to multiple computers interconnected via a network. Specifically, when the transmitting computer delivers software used on receiving computers, the transmitting computer records version information of each piece of delivered software for each receiving computer. Before delivering a new version of the software, the transmitting computer compares that version to the version of software already delivered to each receiving computer. The new version of software is thus delivered only to receiving computers with older versions.

Tokukaihei 11-312080/1999 discloses a technique where a program server machine broadcasts program update information over a network, and a client terminal device determines whether the program needs an update based on received program update information so that only those updates which are determined to be necessary are performed.

In Tokukaihei 7-129407/1995, a server transfers system version information to client terminals so that the client terminals can determine whether they have a program whose version matches that indicated in the information. If the versions do not match, the client terminal decides whether to update the program. Depending on this decision, an update is performed by the server transferring the latest version of the program to the client terminal for storage in the client terminal's program database. Tokukaihei 7-129407/1995 discloses the following modes of updating: (1) All programs are updated. (2) Only old versions of programs are updated according to the version information of the client terminal. (3) Only those selected by the user are updated.

Some trouble may in the communication terminal cause a malfunction of an updated version of software which was updated using an updater, requiring reinstallation of the original software. The user will desire to restore the software condition to the point at which a last updater was installed. The foregoing conventional technology, however, is not capable of responding the desire due to the following problems.

According to the technology disclosed in Tokukaihei 11-272471/1999, the latest version of the software is delivered when the original software is reinstalled in the computer on the receiving end. However, the version information stored in the transmitting computer does not reflect the fact that the original software has been reinstalled in the receiving computer which is thus currently running the original version. Updates older than the latest one are not automatically carried out.

According to the technology disclosed in Tokukaihei 11-312080/1999, only those programs in relation to which update information is broadcast are updated through version comparison. If the user wants to obtain other programs, he must identify the updaters delivered up to that moment to request the server to deliver the identified updaters. The user needs to make notes of the titles of the delivered updaters.

Mode 1 of update operation disclosed in Tokukaihei 7-129407/1995 updates all programs. The user cannot chose which programs are to be updated or not to be updated. He cannot recover the pre-installation configuration because some updated programs may never have been delivered to, and wanted by, the user.

Mode 2 selects only later versions of a program than indicated in the date and time information about the update(s) of the program in the client terminal. If the original software is reinstalled in the client terminal, only those programs newer than the update date and time are selected, and those programs older than the update date and time are not selected.

Mode 3 allows the user no other choice but to repeat the same updating procedures as he once did, starting with the reinstallation of the original software. He then must identify and obtain the same patches and other updaters again as the previous ones, so as to recover the pre-reinstallation configuration.

SUMMARY OF THE INVENTION

The present invention, conceived in view of the above problems, offers, in various embodiments, a content delivery server, communication terminal, content delivery server, content deliver method, content delivery program, terminal control program, and storage medium containing the content delivery program, which is capable of identifying delivered content for each user or communication terminal to allow the user or communication terminal to receive the delivered content directed to the user or communication terminal in a single delivery, in an environment where the content delivery server is connected to a plurality of communication terminals.

Disclosed herein is a content delivery server that delivers content to at least one communication terminal over a communication network, and is characterized in that the server includes:

communication means communicating with the communication terminal; and storage means storing information, wherein the storage means stores delivery management information representing a correspondence relationship between (a) identification information by which the communication terminal is identified and/or identification information by which a user of that communication terminal is identified and (b) delivered content which is content already delivered to a communication terminal corresponding to the identification information, the content delivery server further including:

identifying means retrieving the delivery management information from the storage means to identify delivered content corresponding to the identification information based on the retrieved delivery management information; and delivery means delivering the delivered content identified by the identifying means to the communication terminal corresponding to the identification information.

Here, when the identification information is that by which a user is identified, the communication terminal corresponding to the identification information refers to the communication terminal being used by the user. The delivered content may be stored in the storage means of the content delivery server or in storage means in another server connected to the communication network. In the former case, the delivery means retrieves delivered content identified by the identifying means from the storage means to deliver it to a target communication terminal through the communication means and over the communication network. In the latter case, the delivery means transmits, to another server, information instructing that server to deliver the delivered content identified by the identifying means to a target communication terminal.

According to the arrangement, the storage means stores delivery management information representing a correspondence relationship between (a) identification information by which the communication terminal is identified and/or identification information by which a user of that communication terminal is identified and (b) delivered content which is content already delivered to a communication terminal corresponding to the identification information.

To re-deliver the delivered content to the communication terminal or a communication terminal being used by the user, the delivery means delivers the delivered content corresponding to the identification information to a communication terminal corresponding to the identification information through the communication means and over the communication network based on the delivery management information retrieved by the identifying means.

Thus, in an environment where a plurality of communication terminals are connected to the content delivery server, delivered content can be identified for each user or communication terminal, allowing the user or communication terminal to receive delivered content directed to that user or communication terminal in a single delivery.

Therefore, for example, when the content is software, and the user is to reinstall software, because the user can obtain in a single delivery the delivered software which was delivered previously, the user can restore the environment when updater software was installed for the last time before the reinstallation.

Also disclosed is a communication terminal that receives content from a content delivery server over a communication network, and is characterized in that the terminal includes:

communication means communicating with the content delivery server;

identification information transmitter means obtaining identification information by which the communication terminal is identified and/or identification information by which a user of the communication terminal is identified, to transmit the identification information to the content delivery server through the communication means and over the communication network; and content obtaining means obtaining delivered content over the communication network and through the communication means by the identification information transmitter means transmitting the identification information to the content delivery server, the delivered content being content already received by the communication terminal or a communication terminal being used by the user.

According to the arrangement, the communication terminal can obtain in a single delivery the delivered content already delivered to that terminal or a communication terminal being used by the user by simply transmitting the identification information to the content delivery server. Therefore, for example, when the content is software, and the user is to reinstall software, because the user can obtain in a single delivery the delivered software which was delivered previously, the user can restore the environment when updater software was installed for the last time before the reinstallation.

Additional advantages and novel features of the invention will be set forth in part in the description which follows, and in part will become apparent to those skilled in the art upon examination of the following or may be learned by practice of the invention.

BRIEF DESCRIPTION OF THE DRAWINGS

FIG. 2 shows an example of data registration in a user management database which is part of the software delivery system.

FIG. 6 shows an example of data registration in a user management database which is part of the other embodiment of the software delivery system.

FIG. 8 shows an example of data registration in a user management database which is part of another embodiment of the software delivery system of the present invention.

FIG. 9 shows data in the user management database after an update.

FIG. 11 shows another example of data registration in a user management database.

FIG. 12 shows data in the user management database after an update.

DESCRIPTION OF THE EMBODIMENTS

The following embodiments will focus on a content delivery server delivering software, which is by no means limiting the invention. The "content" delivered by the content delivery server of the present invention includes application software, graphics, and audio.

[Embodiment 1]

Referring to FIGS. 1 to 4, the following will describe embodiments of the software delivery system of the present invention.

Figure 1:
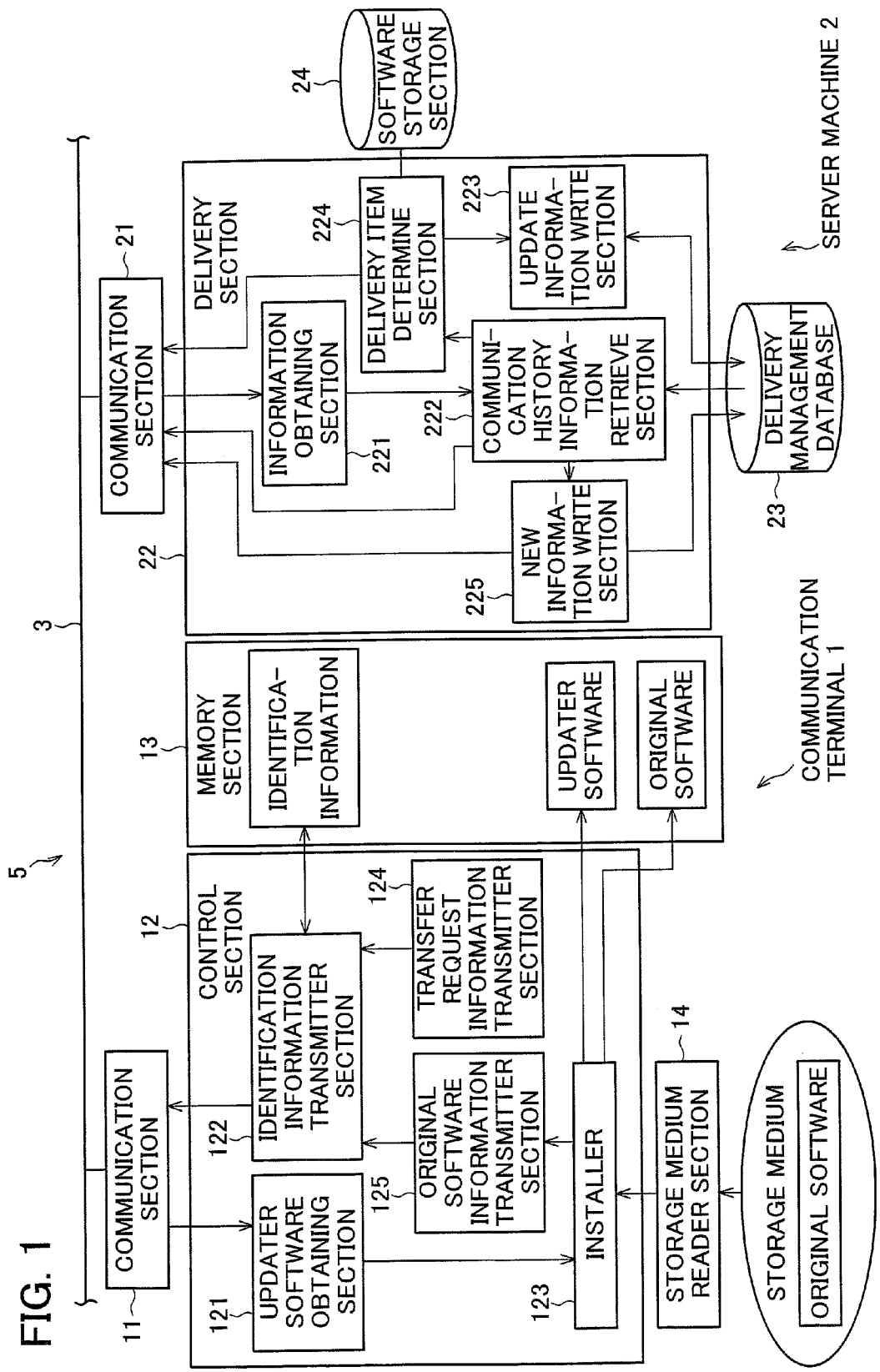
FIG. 1 is a block diagram illustrating an embodiment in accordance with the software delivery system of the present invention.

FIG. 1 is a functional block diagram illustrating the configuration of the software delivery system of the present embodiment. Referring to the figure, the software delivery system 5 includes a communication terminal 1 to which software is to be installed; a server machine (content delivery server) 2 delivering software to the communication terminal 1; and a network (communication network) 3. The communication terminal 1 and the server machine 2 are connected to each other over the network 3. There are usually a plurality of other communication terminals (not shown) connected to the network 3. Another server machine (not shown) may be connected.

Examples of the communication terminal 1 include PCs (Personal Computers), PDAs (Personal Digital Assistants), fixed telephones, mobile telephones, PHS (Personal Handyphone System) terminals, and any other devices which allows for software installation and software reception. Examples of the communication network 3 include the Internet, a LAN (Local Area Network), a telephone network, mobile communication network, and any other publicly known communication network.

The communication terminal 1 is equipped with a communication section 11, a control section 12, a memory section 13, and a storage medium reader section 14.

The communication section 11 communicates with the server machine 2 over the network 3. Thanks to the section 11, the communication terminal 1 is intercommunicatively connected to the server machine 2, transmitting information to/from the server machine 2.

The control section 12 functions to control individual components in the terminal 1 in a unified fashion. The functions may be implemented by, for example, a CPU (central processing unit) running programs. In the present embodiment, the control section 12 is equipped with an updater software obtaining section 121, an identification information transmitter section 122, an installer 123, a transfer request information transmitter section 124, and an original software information transmitter section 125.

The updater software obtaining section 121 obtains updater software from the server machine 2 over the network 3 and the communication section 11.

Updater software is a kind of software which corrects or adds new functions and/or information to original software. The software may be termed correction software. Examples include patches and updaters. Updaters are divided into two categories for each communication terminal: those which have been delivered to the communication terminal (delivered software) and those which have not been delivered to the communication terminal (additional software).

The identification information transmitter section 122 obtains identification information by which individual communication terminals, inclusive of the communication terminal 1, or users are identified, and transmits the identification information to the server machine 2 through the communication section 11. When having obtained identification information, the identification information transmitter section 122 stores the identification information in the memory section 13. When transmitting the identification information to the server machine 2, the identification information transmitter section 122 retrieves the identification information from the memory section 13.

Further, the identification information transmitter section 122 obtains transfer request information (detailed later) from the transfer request information transmitter section 124 and original software information (detailed later) from the original software information transmitter section 125. When having obtained these two kinds of information, the section 122 also transmits the identification information with the two kinds of information to the server machine 2 through the communication section 11.

Here, an example of the identification information is the ID number of the user who installs original software in the communication terminal 1. The following description will assume that the identification information is the user ID number.

Connected to an input section (not shown) which allows the user to input information, the identification information transmitter section 122 obtains the user ID number through the input section.

The installer 123 is for having the memory section 13 store obtained original software and updater software after predetermined procedures, so that the original software and updater software can be used. The installer 123 is realized by an installer program in the obtained original or updater software being executed. When installing the original software, the installer 123 sends to the original software information transmitter section 125 a message that the installer 123 will install the original software.

The original software information transmitter section 125, having obtained from the installer 123 a message that the installer 123 will install the original software, sends original software information showing the type of the original software to the identification information transmitter section 122.

The transfer request information transmitter section 124 is for transmitting transfer request information requesting a transmission of the updater software to the server machine 2 when the user wants to have desired updater software be transmitted from the server machine 2. The transfer request information from the transfer request information transmitter section 124 is temporarily sent to the identification information transmitter section 122. The transfer request information transmitter section 124 obtains the transfer request information from the input section (not shown) allowing the user to input information.

The memory section 13 includes RAM (Random Access Memory), a hard disk drive (HDD), or another storage device for storing various information, and in the present embodiment stores the identification information, the original software, and the updater software.

The storage medium reader section 14 is for retrieving the information from the storage medium. The section 14 retrieves, for example, the original software from a flexible disc, a CD-ROM, a DVD (digital versatile disc) or like storage medium for transmission to the installer 123.

The following is a brief description of a process in which the original and updater software is installed to the communication terminal 1.

First, the storage medium reader section 14 retrieves the original software from the storage medium and executes the installer program to send the retrieved original software to the installer 123. The installer 123 executes the installer program in the incoming original software and performs predetermined procedures on the original software before having the software be stored in the memory section 13. Thus, the user can use the original software on the communication terminal 1.

Next, having obtained a notice from the installer 123 that the original software is to installed, the original software information transmitter section 125 sends original software information to the identification information transmitter section 122. The identification information transmitter section 122 transmits the original software information and identification information to the server machine 2 through the communication section 11. The updater software obtaining section 121 receives a patch or updater software for the original software from the server machine 2 through the communication section 11 and over the network 3 and sends the updater software to the installer 123. The installer 123 performs predetermined procedures on the incoming updater software before having the software be stored in the memory section 13. Thus, the user can correct the original software to build a desired software environment for use.

The server machine 2 includes a communication section 21, a delivery section 22 delivering content, such as software, to a plurality of terminal devices, a delivery management database 23, and a software storage section 24. The delivery section 22 includes an information obtaining section 221, a communication history information retrieve section 222, an update information write section 223, a delivery item determine section 224, and a new information write section 225.

The communication section 21 is a communication means for communication with a plurality of terminal devices and another server machine over the network 3. Thanks to the section 21, the server machine 2 is intercommunicatively connected to the communication terminal 1, transmitting information to/from the server machine 2. For example, the communication section 21 can receive the user ID number which is the identification information from the communication terminal 1 to deliver particular updater software to the communication terminal 1.

The information obtaining section 221 obtains the identification information, original software information, and transfer request information from a plurality of communication terminals through the communication section 21 and over the network 3. The information obtaining section 221 sends the obtained identification information, original software information, and transfer request information to the communication history information retrieve section 222.

The communication history information retrieve section 222 is for retrieval of specific information in reference to the delivery management database 23. The specific information includes information representing the correspondence relationship between the identification information transmitted from the communication terminal and the information representing the software already delivered to the user having the identification information (delivered software). The information representing the delivered software is termed software delivery history information. The communication history information retrieve section 222 hence can simultaneously retrieve the identification information and the software delivery history information associated with the identification information.

As mentioned earlier, the communication history information retrieve section 222 obtains either the identification information and the original software information or the identification information and the transfer request information from the information obtaining section 221. Further, the communication history information retrieve section 222 determines whether the obtained identification information is present in the delivery management database 23.

If having obtained the identification information and the original software information and determined that the identification information is present in the delivery management database 23, the communication history information retrieve section 222 sends the identification information and the software delivery history information corresponding to the identification information to the delivery item determine section 224.

If having obtained the identification information and the original software information and determined that the identification information is not present in the delivery management database 23, the communication history information retrieve section 222 sends the identification information and the original software information to the new information write section 225.

If having obtained the identification information and the transfer request information and determined that the identification information is present in the delivery management database 23, the communication history information retrieve section 222 sends the identification information and the transfer request information to the delivery item determine section 224.

If having obtained the identification information and the transfer request information and determined that the identification information is not present in the delivery management database 23, the communication history information retrieve section 222 transmits an error message to the communication terminal 1 through the communication section 21 and over the network 3.

The new information write section 225 is for writing new information to the delivery management database 23. The new information write section 225, as mentioned earlier, obtains the identification information and the original software information from the communication history information retrieve section 222 to newly write information representing the correspondence relationship between the identification information and the information representing the original software to the delivery management database 23. That is, the new information write section 225 newly register the software delivery history information corresponding to the identification information. Also, the new information write section 225 transmits result information that information has been registered in the delivery management database to the communication terminal 1 through the communication section 21 and over the network 3.

The delivery item determine section 224 obtains either the software delivery history information corresponding to the identification information and the identification information or the identification information and the transfer request information from the communication history information retrieve section 222. The delivery item determine section 224 is for determining the software which is an item to be delivered (delivery item software) from the information to retrieve the determined delivery item software from the software storage section 24 for delivery to the communication terminal through the communication section 21 and over the network 3. Also, the delivery item determine section 224 sends information representing delivery item software with the identification information to the update information write section 223.

If having obtained the identification information and the software delivery history information, the delivery item determine section 224 determines the delivered software as the delivery item software from that information to retrieve the delivery item software from the software storage section 24 for delivery to the communication terminal being used by the user corresponding to the identification information.

If having obtained the identification information and the transfer request information, the delivery item determine section 224 determines only the updater software (updater software desired by the user) which appears in the transfer request information as the delivery item software for delivery of the delivery item software to the communication terminal being used by the user corresponding to the identification information.

In this manner, the delivery item determine section 224 delivers the delivered software or the updater software desired by the user to the communication terminal. In that delivery, if there is a patch, updater software, or other additional software determined by the server machine 2 to be in need of a new update, it may also be determined as delivery item software for delivery.

The update information write section 223 is for writing update information in the delivery management database 23. The update information write section 223, as will be detailed later, obtains information representing the identification information and the delivery item software from the delivery item determine section 224, to write information representing the correspondence relationship between the information representing the additional software in the delivery item software and the identification information to the delivery management database 23. That is, the section 223 updates the information representing the delivered software corresponding to the identification information.

The software storage section 24 is a memory section storing a set of updater software to be delivered by the server machine 2 to communication terminals including the communication terminal 1.

The delivery management database 23 is made up of information representing the correspondence relationship between the identification information of the user and the information representing the software already delivered to the user (software delivery history information). The delivery management database 23 is stored in a well-known storage device (storage means) like a hard disk drive (HDD).

FIG. 2 shows an example of information registration in the delivery management database 23 in FIG. 1. The following description will take as an example the installation of software 001 which is original software, patches, and updater software including updater software 002 and succeeding pieces of updater software in each communication terminal.

Referring to FIG. 2, the delivery management database 23 records the software delivery history information in the form of, for example, software titles, "software 001" and "software 002," for software 001 and software 002 respectively for each piece of identification information which is a user ID number in the form of, for example, "user A" and "user B." For example, FIG. 2 shows that the user with identification information "user A" installed software 001 into the communication terminal 1 used by the user, and thereafter the server machine 2 delivered patches and updater software entitled updater software 002 to the communication terminal 1. FIG. 2 also shows that the user with identification information "user B" installed software 001 into the communication terminal used by the user, and thereafter the server machine 2 delivered software 003 and software 004 to the communication terminal.

The information registered in the delivery management database 23 may be organized differently: for example, the identification information may be sorted for each software title.

Figure 3:
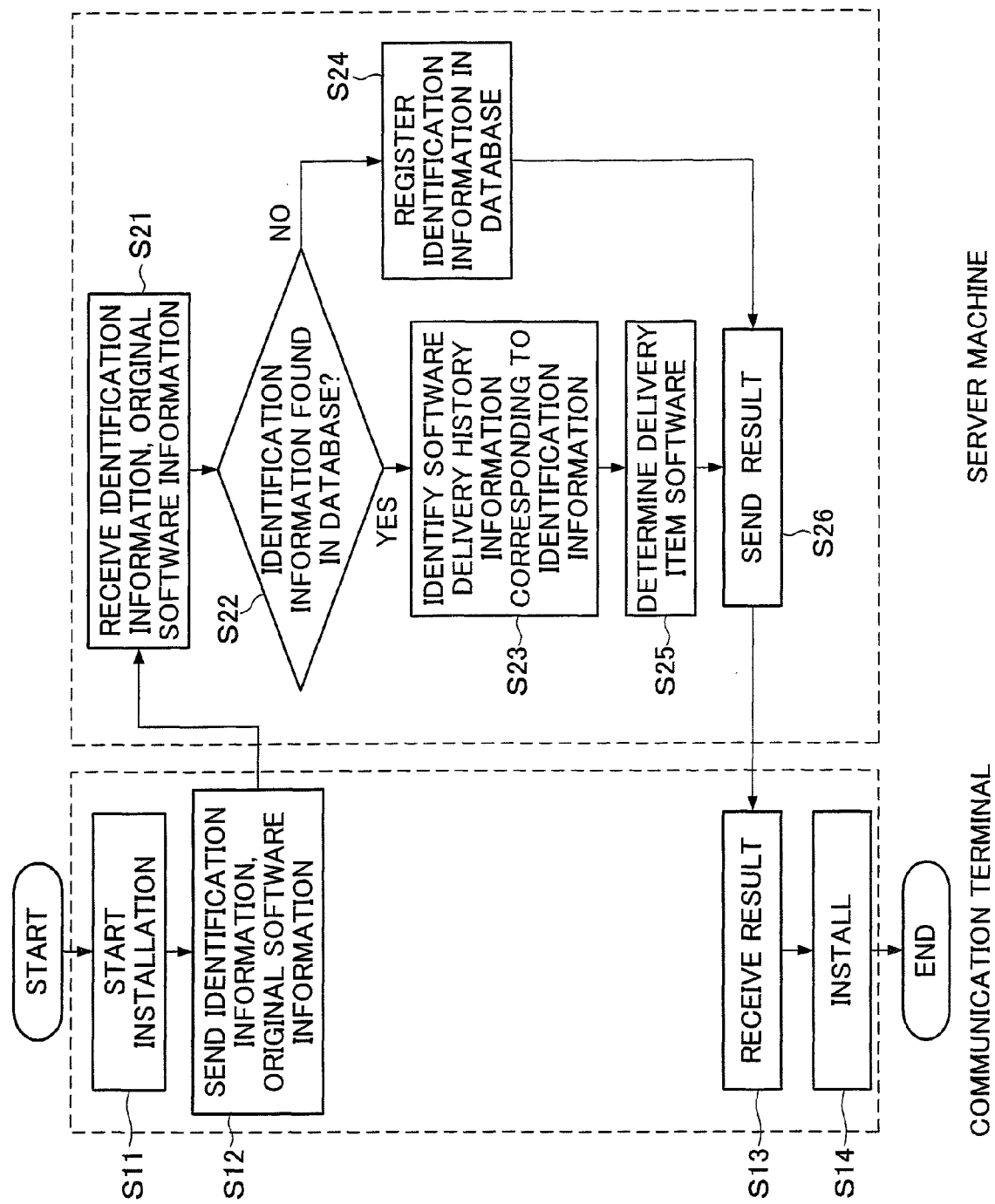
FIG. 3 is a flow chart illustrating an example of an original software installation in the software delivery system.

FIG. 3 is a flow chart illustrating original software installation in the present embodiment. FIG. 3 shows the operation being divided between the communication terminal 1 and the server machine 2.

The original software installation may be the first-time installation by the user (original installation) or a second-time or later installation (reinstallation) after the original installation. The following will first describe an original installation in reference to FIG. 3.

In the communication terminal 1, the storage medium reader section 14 retrieves original software from a storage medium for a transfer of the original software to the installer 123 which installs the original software (step S11). The installer 123 in step S11 sends to the original software information transmitter section 125 a message that original software will be installed.

Next, the original software information transmitter section 125 sends the original software information to the identification information transmitter section 122. The identification information transmitter section 122 automatically transmits the identification information and the original software information to the server machine 2 through the communication section 11 and over the network 3 (step S12).

Under these circumstances, the identification information transmitter section 122 has obtained the user ID number which is identification information in step S11 or in a step prior to step S11 as above. If having done so in a step prior to step S11, the identification information transmitter section 122 retrieves the identification information from the memory section 13.

In the server machine 2, the information obtaining section 221 receives the identification information and the original software information from the communication terminal 1 over the network 3 and through the communication section 21 (step S21).

The information obtaining section 221 sends the received identification information and original software information to the communication history information retrieve section 222. The communication history information retrieve section 222 searches the delivery management database 23 for the received identification information (step S22).

In the case of an original installation, the delivery management database 23 does not contain the identification information (NO in step S22); the communication history information retrieve section 222 therefore sends the identification information and the original software information to the new information write section 225. The new information write section 225 newly registers the received identification information and original software information (step S24). Next, the new information write section 225 transmits result information that information has been registered in the delivery management database to the communication terminal 1 (step S26).

The communication section 11 in the communication terminal 1 receives the result information that information has been registered in the database from the server machine 2 (step S13). Thereafter, the installer 123 continues to install the original software (step S14).

Suppose, as an example, that a user with identification information "user B" performs an original installation for software 001, titled "software 001," which is original software from a storage medium into the communication terminal 1.

In step S12, the identification information transmitter section 122 transmits, to the server machine 2, the identification information "user B" and message information that "software 001" is installed.

In step S21, the information obtaining section 221 obtains this information. The communication history information retrieve section 222 in steps S22, S24 determines that the delivery management database does not contain the identification information "user B." The new information write section 225 newly registers information representing the correspondence relationship between "user B" and "software 001" in the delivery management database 23.

Thereafter, the installation of the software 001 in the communication terminal 1 is completed by steps S26, S13, S14.

Figure 4:
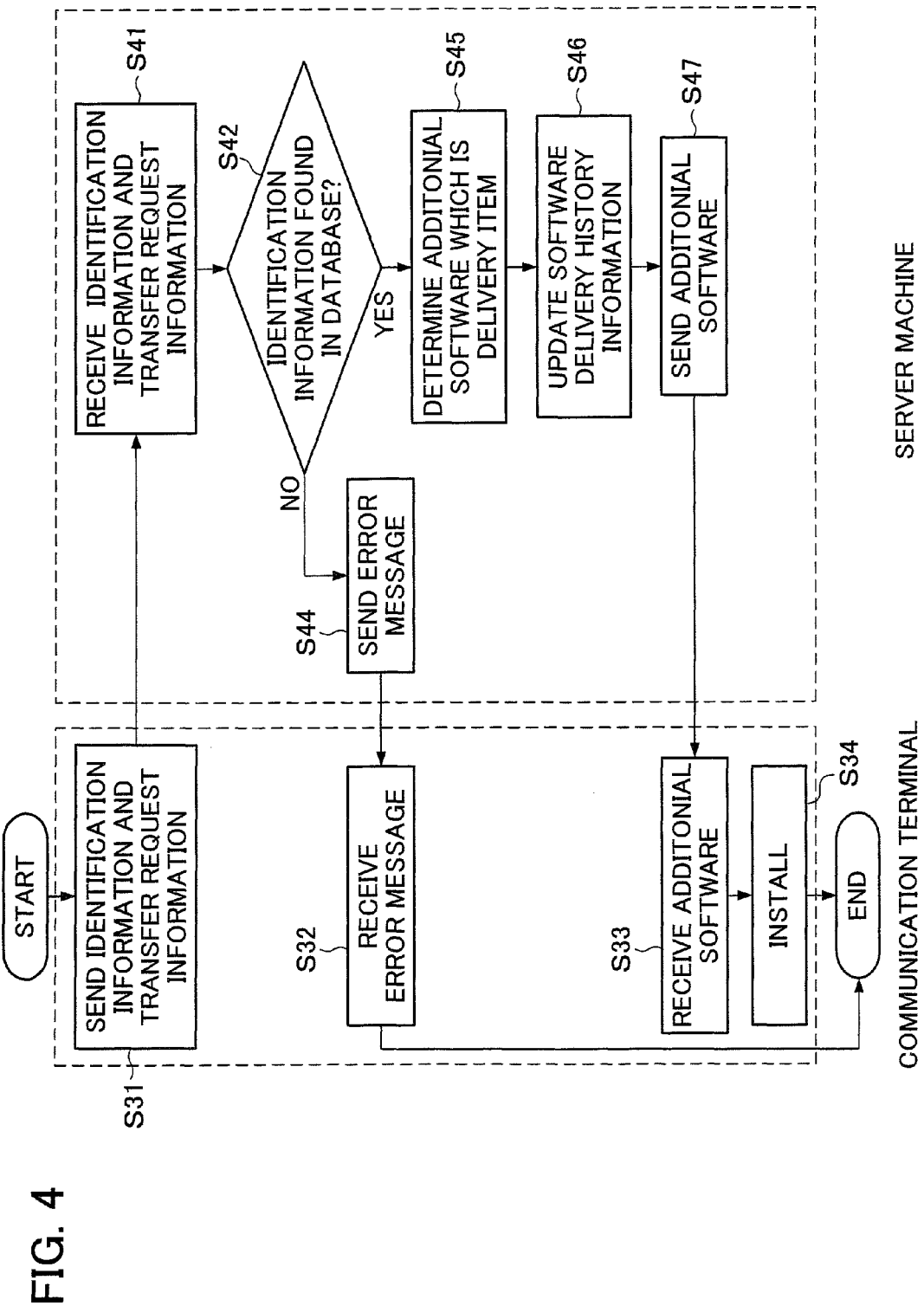
FIG. 4 is a flow chart illustrating an example of an additional software installation in the software delivery system.

Next, referring to FIG. 4, an operation will be described which is performed when a user makes a request to the server machine 2 for a transmission of updater software including additional software yet to be delivered after the installation of original software in the communication terminal 1. FIG. 4 shows the operation being divided between the communication terminal 1 and the server machine 2.

First, the transfer request information transmitter section 124 in the communication terminal 1 sends transfer request information requesting a transmission of the updater software desired by the user to the identification information transmitter section 122. On obtaining the transfer request information, the identification information transmitter section 122 obtains the identification information or retrieves the identification information from the memory section 13. The identification information transmitter section 122 then transmits the transfer request information and the identification information to the server machine 2 through the communication section 11 and over the network 3 (step S31).

In the server machine 2, the information obtaining section 221 receives the identification information and the transfer request information over the network 3 and through the communication section 21 and sends the received information to the communication history information retrieve section 222 (step S41).

Next, the communication history information retrieve section 222 searches the delivery management database 23 for the received identification information (step S42).

If the delivery management database 23 does not contain the received identification information (NO in step S42), it indicates that the identification information was not registered when the original software was installed for the first time. The communication history information retrieve section 222 transmits an error to the communication terminal 1 through the communication section 21 (step S44). In this situation, the communication section 11 in the communication terminal 1 receives the error (step 32), and the communication terminal 1 ends the operation.

In contrast, if the delivery management database 23 contains the already received identification information (YES in step S42), the communication history information retrieve section 222 sends the identification information and the received transfer request information to the delivery item determine section 224. The delivery item determine section 224 determines the updater software of which a transfer is requested from the communication terminal 1 as the delivery item software by referring to the transfer request information, and retrieves the delivery item software from the software storage section 24 (step S45).

In this situation, the section 224 may determine, as the delivery item software, patches and updater software, if any, other than the updater software of which a transfer was requested by the communication terminal 1, but determined by the server machine 2 to be needed for new updates.

Next, the delivery item determine section 224 sends the information representing the determined delivery item software and the identification information to the update information write section 223. The update information write section 223 compares the information representing the delivery item software to the software delivery history information corresponding to the received identification information registered in the delivery management database 23. Here, if the information related to the received delivery item software contains information that cannot be found in the software delivery history information, that information is added to the software delivery history information as additional software newly delivered. That is, the software delivery history information is updated (step S46).

The delivery item determine section 224 then transmits the delivery item software retrieved from the software storage section 24 to the communication terminal 1 corresponding to the identification information through the communication section 21 and over the network 3 (step S47).

The updater software obtaining section 121 receives the delivery item software from the server machine 2 through the communication section 11 (step S33) for transmission to the installer 123. The installer 123 installs the received software (step S34).

As a result, the delivery history of the patches and updater software obtained after the user installed the original software is recorded in the delivery management database 23 in the server machine 2.

As a result, the delivery management database is certainly updated with the latest software delivery history information.

Next, referring to FIG. 3, an operation of the server machine 2 and the communication terminal 1 will be described which is performed when software is installed for the second time (reinstallation) after the original installation by the user.

Software is reinstalled, for example, to address the problem of erroneous deletion of a program which is part of software having been used by the user in desired environment settings after the user installed original software and updater software into the communication terminal 1. As another example, software may be reinstalled in a new communication terminal 1 which the user has bought to replace the old communication terminal.

After steps similar to S11, S12, S21 in the aforementioned case of an original installation, the information obtaining section 221 receives the identification information and the original software information from the communication terminal 1 over the network 3 and through the communication section 21.

The information obtaining section 221 sends the received identification information and original software information to the communication history information retrieve section 222. The communication history information retrieve section 222 searches the delivery management database 23 for the received identification information (step S22).

In the case of reinstallation, because the identification information was previously registered in step S24 in the original installation (YES in step S22), the communication history information retrieve section 222 identifies the software delivery history information corresponding to the identification information in the delivery management database 23 (step S23).

Next, the communication history information retrieve section 222 sends the identification information and the software delivery history information corresponding to the identification information to the delivery item determine section 224. The delivery item determine section 224 determines the updater software already delivered to the user, that is, the delivered software, as the delivery item software based on received software delivery history information, and retrieves the delivery item software from the software storage section 24 (step S25).

Thereafter, the delivery item determine section 224 transmits the determined delivered software to the communication terminal 1 which transmitted the identification information through the communication section 21 and over the network 3, based on the received identification information (step S26).

The updater software obtaining section 121 in the communication terminal 1 receives the delivered software through the communication section 11 (step S13). The updater software obtaining section 121 sends the received delivered software to the installer 123. The installer 123 installs the software by performing predetermined procedures on the original software and the delivered software and having this software be stored in the memory section 13 (step S14).

As a result, in the case of the original software being reinstalled, the software environment in which all software delivered before the reinstallation is installed can be instantly restored.

For example, suppose that a user with identification information "user B" reinstalls software 001 which is original software from a storage medium into the communication terminal 1. Suppose also that the user has performed an original installation of the software 001 before the reinstallation and received software 003 and software 004 which is both updater software from the server machine 2. The software 003 and software 004 can be obtained by, for example, transmitting transfer request information to the server machine 2 as mentioned earlier.

In this case, the delivery management database 23 in the server machine 2 records, as shown in FIG. 2, the identification information "user B" and the software delivery history information "software 001," "software 003," and "software 004" in an associated manner.

In step S11, the storage medium reader section 14 retrieves the software 001 from a storage medium and sends the software 001 to the installer 123. The installer 123 installs the software 001. Then, in steps S12, S21, the communication terminal 1 transmits to the server machine 2 the identification information "user B" and message information that the "software 001" is being installed.

Next, after steps S22, S23, the communication history information retrieve section 222 identifies the "software 001," "software 003," and "software 004" which is the software delivery history information corresponding to the identification information "user B" from the delivery management database 23.

Further, in step S25, the delivery item determine section 224 determines the software 003 and the software 004 which is delivered software as the delivery item software, and retrieves the software 003 and the software 004 from the software storage section 24. Next, in steps S26, S13, the server machine 2 transmits the software 003 and the software 004 to the communication terminal 1.

The communication terminal 1 installs the software 001, the software 003, and the software 004 in step S14.

As a result, when the user B reinstalls the original software "software 001," the user B can automatically instantly obtain the patches and updater software "software 003" and "software 004" which were previously obtained. The user can instantly restore the software environment when updater software was installed for the last time before the reinstallation.

As in the foregoing, the content delivery server of the present embodiment is the server machine 2 delivering software to one or more communication terminals over the network 3. The content delivery server includes the communication section 21 communicating with the communication terminal(s) and a storage device storing information. The storage device stores the delivery management database 23 containing the correspondence relationship between the identification information by which users are identified and the delivered software which is software already delivered to the communication terminals or users corresponding to the identification information. Further, the content delivery server includes: the communication history information retrieve section 222 retrieving the delivery management database 23 from the storage means and identifying the delivered software corresponding to the identification information from the retrieved delivery management database 23; and the delivery item determine section 224 delivering the delivered software identified by the communication history information retrieve section 222 to the communication terminal being used by the user corresponding to the identification information.

According to the arrangement, when re-delivering delivered software to the communication terminal being used by the user, the delivery item determine section 224 delivers the delivered software corresponding to the identification information to the communication terminal being used by the user corresponding to the identification information through the communication section 21 and over the network 3 based on the delivery management database 23 retrieved by the communication history information retrieve section 222.

As a result, the delivered software is identifiable for each user even when a plurality of communication terminals are connected to the server machine 2. The user can obtain the delivered software to the user in a single delivery.

Therefore, when the user is to reinstall the original software, because the user can obtain in a single delivery the delivered software which was delivered previously, the user can restore the environment when updater software was installed for the last time before the reinstallation.

The server machine 2 of the present embodiment, in addition to the foregoing arrangement, includes the information obtaining section 221 obtaining the identification information from the communication terminal, and the communication history information retrieve section 222 identifies the delivered software corresponding to the identification information obtained by the information obtaining section 221.

According to the arrangement, the server machine 2 upon obtaining the identification information, can deliver the delivered software to the communication terminal being used by the user corresponding to the identification information. The delivered software can be delivered to the communication terminal being used by the user who desires a deliver of the delivered software more efficiently.

Therefore, when the user is to reinstall the original software, because the user can immediately obtain the delivered software by transmitting the identification information from the communication terminal to the content delivery server, the user can install the delivered content at the same time as the reinstallation of the original software. Consequently, the user can more instantly restore the software environment when the updater software was installed for the last time before the reinstallation.

The server machine 2 of the present embodiment, in addition to the arrangement, includes the new information write section 225 which, if the identification information obtained by the information obtaining section 221 is new identification information absent from the delivery management database 23, performs a new registration by adding the new identification information to the delivery management database 23 and writing the new identification information to the storage means.

According to the arrangement, the new information write section 225 adds the new identification information to the delivery management database 23. As a result, when software is afterwards delivered to the communication terminal being used by the user corresponding to the identification information, the delivery management database 23 is updated so that the correspondence relationship between the identification information and the delivered software continues to be built up.

The server machine 2 of the present embodiment, in addition to the arrangement, is such that the delivery item determine section 224 delivers additional software other than the delivered software to the communication terminal.

According to the arrangement, the server machine 2 can deliver the latest software which is yet to be obtained by the user. As a result, the user can utilize the latest software.

The server machine 2 of the present embodiment, in addition to the arrangement, includes the update information write section 223 which, when the delivery item determine section 224 has delivered additional software, updates the delivery management database 23 by adding the information about the delivered additional software to the information about the delivered software corresponding to the identification information corresponding to the deliver destination.

According to the arrangement, the information representing the delivered software in the delivery management database 23 is always updated, reflecting the latest information. As a result, the delivery management database 23 contains every piece of the delivered software corresponding to the identification information. Therefore, the server machine 2 certainly can re-deliver all the delivered software up to the piece delivered last time.

The server machine 2 of the present embodiment, in addition to the arrangement, is such that the software to be delivered is correction software which corrects the original software.

According to the arrangement, the user can correct inconveniences of the original software using the correction software.

The communication terminal 1 of the present embodiment includes: the communication section 11 receiving software from the server machine 2 over the network 3 and communicating with the server machine 2; the identification information transmitter section 122 obtaining the identification information which is information by which the user of itself is identified and sending the identification information to the server machine 2 through the communication section 11 and over the network 3; and the updater software obtaining section 121 obtaining the delivered software which is software already received by the user over the network 3 and through the communication section 11 by the identification information transmitter section 122 sending the identification information to the server machine 2.

According to the arrangement, the user can obtain in a single delivery the delivered software which was already delivered by the communication terminal 1 only transmitting the identification information to the server machine 2. Therefore, when the user is to reinstall software, the user can obtain in a single delivery the delivered software which was previously delivered. The user can restore the environment when updater software was installed for the last time before the reinstallation.

The communication terminal 1 of the present embodiment, in addition to the arrangement, includes the transfer request information transmitter section 124 transmitting information requesting a transmission of software to the server machine 2 through the communication section 11 and over the network 3, and the transfer request information transmitter section 124 obtains the software requested by the updater software obtaining section 121 by transmitting the information.

According to the arrangement, a request can be made to the server machine 2 for a transmission of software other than the delivered software. The software can be readily obtained. As a result, the user can use the communication terminal 1 in a desired software environment.

The communication terminal 1 of the present embodiment, in addition to the arrangement, includes the storage medium reader section 14 reproducing certain software from the storage medium, and the delivered software obtained by the updater software obtaining section 121 is correction software correcting the software reproduced by the storage medium reader section 14.

According to the arrangement, the communication terminal 1, when obtain software again from the storage medium, can obtain correction software for the obtained software again. As a result, the original software which is large in data volume is obtained from the storage medium, whereas the correction software which is small in data volume is obtained over the communication network. Workload in communication is reduced. The original software and the correction software can be more readily obtained again.

The communication terminal 1 of the present embodiment is such that the identification information is the user ID number. According to the arrangement, the user can assign identical identification information to all communication terminals being used by the user. Consequently, the delivered software delivered to one of the communication terminals can be installed from the server machine 2 to another communication terminal. As a result, all communication terminals being used by the user can share an identical software environment.

In the embodiment, the software storage section 24 was presumed to be located in the server machine 2, but is not limited to this. For example, the software storage section may be located in another server machine. When this is the case, the delivery item determine section 224 sends an delivery instruction to the other server machine including the software storage section. A delivery instruction is an instruction to deliver delivery item software determined by the user corresponding to the identification information. As a result, the other server machine retrieves the delivery item software from the software storage section for a delivery to the communication terminal being used by the user. In addition, the software storage section 24 may be an external storage device such as a disc changer.

In addition, in the embodiment, the storage medium reader section 14 retrieves the original software from the storage medium. However, this is by no means limiting. The original software may be delivered from the server machine 2 or another server machine over the network 3. When this is the case, the original software is stored in the software storage section 24.

Further, in the embodiment, an example was taken in which the user ID number was used as the identification information of the user. This is by no means limiting. For example, a combinations of at least one or more of ID numbers specified for individual communication terminals, ID numbers specified for individual original software, and ID numbers specified for individual storage media containing the original software may be used.

When using the ID numbers of the communication terminals, the ID number of the software reproduced by the storage medium reader section 14, and the ID numbers of the storage media containing the software, the user does not have to input an ID number.

Further, when using the ID numbers of the communication terminals, software environment can altered from one communication terminal to the other. In addition, when using the ID number of the software, the identification information contains information about the software; therefore, the server machine can readily search for software to be delivered corresponding to the software.

According to the arrangement, the server machine 2 can certainly identify the user or the communication terminal without erring. As a result, correct delivered software can be more certainly delivered again to the user or the communication terminal.

It should be noted that when ID numbers specified for individual storage media containing original software are used as the identification information, the storage medium reader section 14 retrieves the ID number from the storage medium for transmission to the identification information transmitter section 122.

In addition, the flow chart in FIG. 4 shows an update of the software delivery history information in step S46 which is followed by a transmission of the delivery item software in step S47. The invention is not limited to this order of actions. The order may be reversed.

In addition, the identification information transmitter section 122 was supposed to transmit the original software information with the identification information when reinstalling the original software. The section 122 may transmit only the identification information.

[Embodiment 2]

Figure 5:
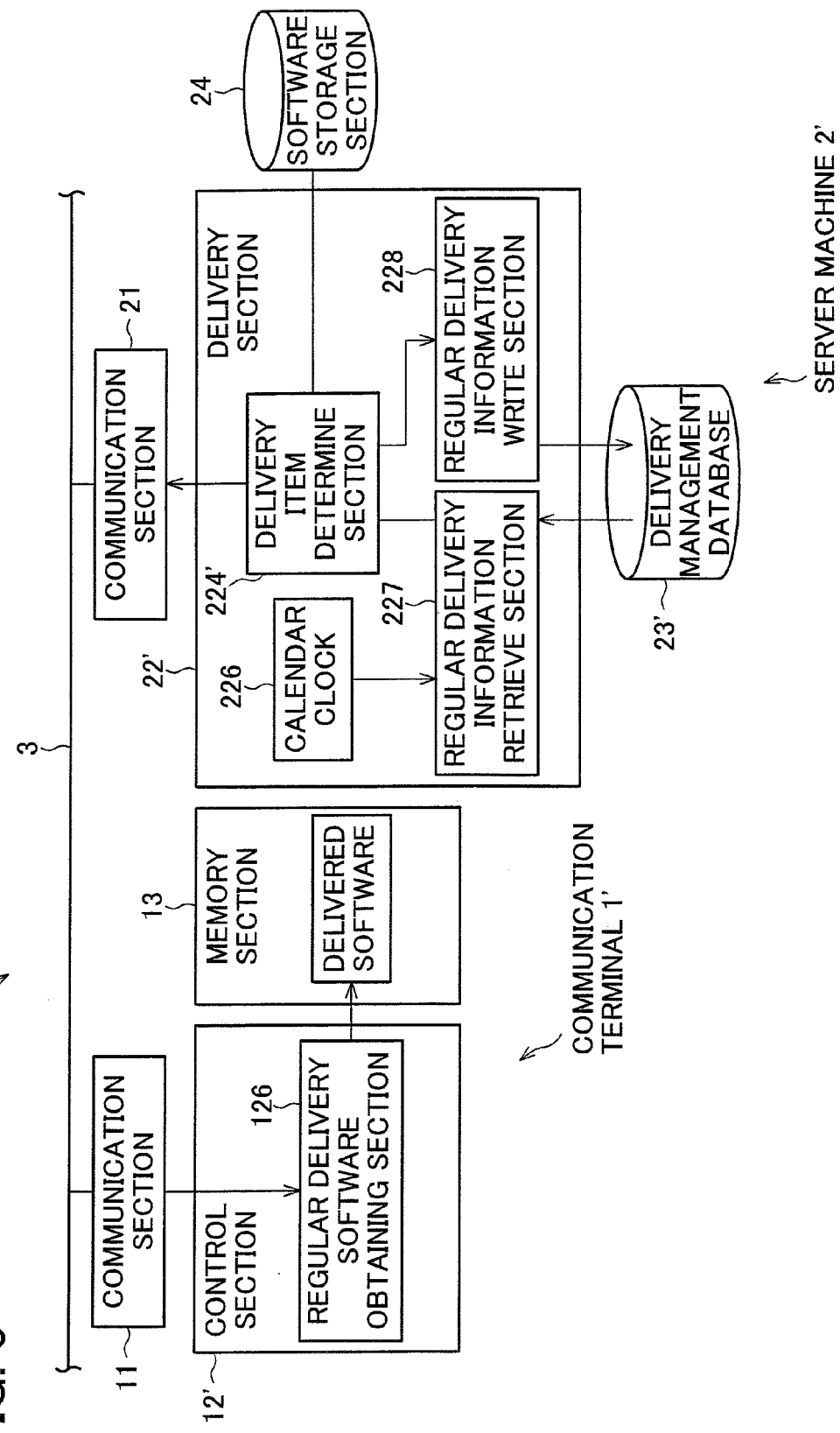
FIG. 5 is a block diagram illustrating another embodiment in accordance with the software delivery system of the present invention.
Figure 7:
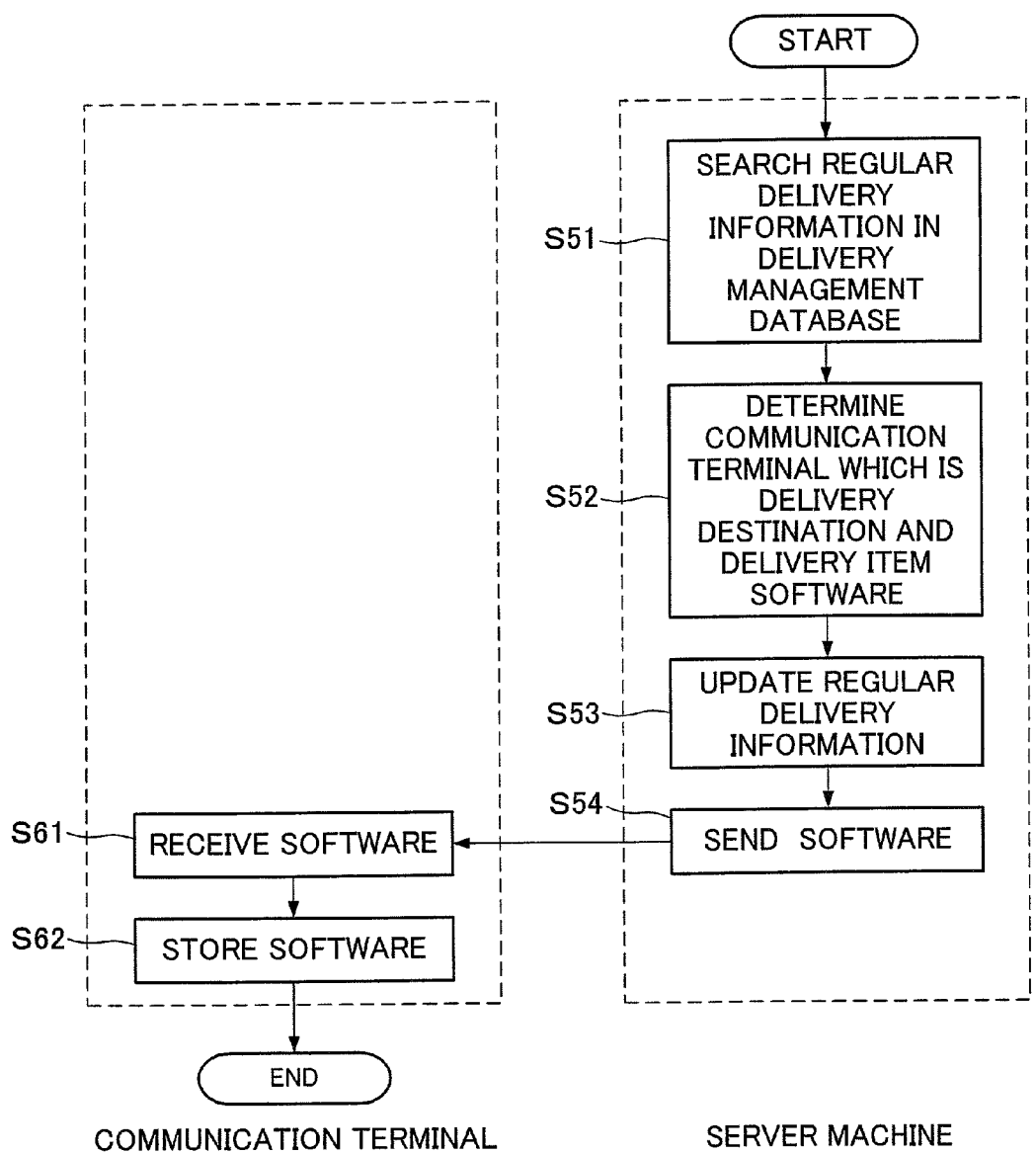
FIG. 7 is a flow chart illustrating a regular delivery in the other embodiment of the software delivery system.

The following will describe another embodiment of the software delivery system of the present invention, referring to FIGS. 5 and 7. Here, for convenience, members of the present embodiment that have the same arrangement and function as members of the foregoing embodiment, and that are mentioned in that embodiment are indicated by the same reference numerals and description thereof is omitted.

In the present embodiment, the delivered software is stored (backed up) in a storage section in the communication terminal side on the communication terminal side for every predetermined period according to information regularly delivered from a server machine.

FIG. 5 is a functional block diagram illustrating a configuration of a software delivery system in accordance with the present embodiment.

Referring to FIG. 5, the software delivery system 5' of the present embodiment includes: a communication terminal 1' which is a destination to which software is to be regularly delivered; a server machine (content delivery server) 2' delivering software to the communication terminal 1'; and a network (communication network) 3. The communication terminal 1' and the server machine 2' are connected to each other over the network 3. There are usually a plurality of other communication terminals (not shown) connected to the network 3. Another server machine (not shown) may be connected.

The communication terminal 1' is equipped with a communication section 11, a control section 12', and a memory section 13.

The control section 12' is equipped with a regular delivery software obtaining section 126. The section 12' may additionally be equipped with, although not shown, an updater software obtaining section 121, an identification information transmitter section 122, an installer 123, and a transfer request information transmitter section 124, similarly to the foregoing embodiment.

The regular delivery software obtaining section 126 is for obtaining delivered software regularly delivered from the server machine 2'. The regular delivery software obtaining section 126 stores the obtained delivered software in the memory section 13.

The server machine 2' includes a communication section 21, a delivery section 22' delivering software and other content to a plurality of terminal devices, a delivery management database 23', and a software storage section 24.

The delivery section 22' includes a regular delivery information retrieve section 227, a calendar clock 226, a regular delivery information write section 228, and a delivery item determine section 224'. The section 22' may additionally include, although not shown, an information obtaining section 221, a communication history information retrieve section 222, an update information write section 223, and a new information write section 225, similarly to the foregoing embodiment.

The regular delivery information retrieve section 227 is for retrieving information from the delivery management database 23'. The information contains identification information owned by users, software delivery history information representing the software delivered to the users (delivered software), and regular delivery information representing the date and time of the last regular deliver to the user. The regular delivery information retrieve section 227 receives time information representing the current date and time from the calendar clock 226 either continuously or once for every predetermined period of time. Further, the regular delivery information retrieve section 227 sends to the delivery item determine section 224' the information retrieved from the delivery management database 23' and the time information received from the calendar clock 226.

FIG. 6 shows an example of registered information in the delivery management database 23' in FIG. 5. The following description will take as an example an installation by a user of software 001 which is original software and updater software including updater software 002 and succeeding pieces of updater software.

The delivery management database 23' records the software delivery history information for each piece of identification information in the form of, for example, "user A," "user B," and the regular delivery information representing the dates and times when the server machine 2 made regular deliveries. FIG. 6 shows that a user with the identification information "user A" installed software titled "software 001" to a communication terminal being used by the user, and thereafter the server machine 2 delivered updater software titled "software 002." FIG. 6 also shows that a regular delivery was made at a date and time "a". Similarly, the figure shows that a user with identification information "user B" installed software titled "software 001," thereafter the server machine 2 delivered updater software titled "software 003" and "software 004," and a regular deliver was made at a date and time "b".

In this manner, the delivery management database 23' manages the identification information, the software delivery history information, and the regular delivery information in an associated fashion. Consequently, the regular delivery information retrieve section 227 can retrieve the regular delivery information and also simultaneously retrieve the software delivery history information corresponding to the identification information and the regular delivery information corresponding to the regular delivery information. The regular delivery information retrieve section 227 compares the current time information received from the calendar clock 226 to the regular delivery information in the delivery management database 23' to retrieve regular delivery information which differs from the current time information by an amount equal to, or in excess of, a predetermined period. At the same time, the section 227 retrieves also the identification information and the software delivery history information corresponding to the regular delivery information. The regular delivery information retrieve section 227 sends the identification information, the software delivery history information, and the time information to the delivery item determine section 224'.

The delivery management database 23' is stored in a well-known storage device (storage means) like a HDD.

The calendar clock 226 represents the current date and time (time information) and sends the time information to the regular delivery information retrieve section 227.

The delivery item determine section 224' obtains the identification information, the software delivery history information, and the time information from the regular delivery information retrieve section 227. The delivery item determine section 224' determines from the identification information the communication terminal which is being used by the user having the identification information that is a regular deliver destination. The section 224' determines also the delivered software as the delivery item software from the software delivery history information. As a result, the delivery item determine section 224' delivers the delivered software to the determined communication terminal. In addition, the delivery item determine section 224' sends the obtained time information to the regular delivery information write section 228 for each piece of identification information.

The regular delivery information write section 228 is for writing information to the delivery management database 23. With the time information obtained from the delivery item determine section 224' as the regular delivery information, the regular delivery information write section 228 writes the information representing the correspondence relationship between the regular delivery information and the identification information to the delivery management database 23'. That is, the section 228 updates the regular delivery information in the delivery management database 23'.

The delivery management database 23' is for managing the identification information of the user, the software delivery history information, and the regular delivery information. The database 23' records these three kinds of information in a mutually associated manner.

FIG. 7 is a flow chart illustrating an operation in accordance with the present embodiment. The operation is divided between the communication terminal 1' and the server machine 2' in FIG. 7.

First, on the server machine 2', the regular delivery information retrieve section 227 obtains the time information representing the current date and time from the calendar clock 226, and conduct a search based on the regular delivery information from the delivery management database 23' to identify such regular delivery information that the time information differs from date and time of an earlier regular delivery by an amount equal to, or in excess of, a predetermined period. Based on the search result of S51, the regular delivery information retrieve section 227 retrieves the identification information and the software delivery history information corresponding to the identified regular delivery information from the delivery management database 23' (step S51). The following steps presume that the communication terminal 1' has been identified.

Next, the regular delivery information retrieve section 227 sends the retrieved identification information, the software delivery history information, and the time information to the delivery item determine section 224'. The delivery item determine section 224' determines the delivery item software based on the software delivery history information. Further, the delivery item determine section 224' determines the communication terminal which is to be the deliver destination from the obtained identification information (step S52). Here, the delivery item software is delivered software which was already delivered from the server machine 2' to the communication terminal 1'.

Next, the delivery item determine section 224' sends the retrieved identification information, the software delivery history information, and the time information to the regular delivery information write section 228. The regular delivery information write section 228 updates the date and time in the regular delivery information registered in the delivery management database 23' (step S53). The delivery item determine section 224' retrieves the delivery item software from the software storage section 24 for transmission to the communication terminal 1' through the communication section 21 and over the network 3 (step S54).

The regular delivery software obtaining section 126 receives the regular delivery software from the server machine 2' (step S61). The regular delivery software obtaining section 126 stores the received software in the memory section 13 in the communication terminal 1' (step S62).

As in the foregoing, the delivery management database 23' in the server machine 2' of the present embodiment records the correspondence relationship between the identification information, the software delivery history information, and the regular delivery information representing the delivery time of the delivered software. The regular delivery information retrieve section 227 identifies such identification information that a predetermined period has elapsed from the deliver time and the delivered software corresponding to the identification information according to the delivery management database 23'.

According to the arrangement, the communication terminal 1' can obtain the delivered software through a regular delivery from the server machine 2' and automatically readily perform regular backups of delivered content by automatically performing backups concurrently with the regular delivery. Therefore, when wishing to obtain delivered software again, the user can retrieve the delivered software from the backup without having to making a request to the server machine 2' for a re-delivery.

[Embodiment 3]

The following will describe another embodiment of the software delivery system of the present invention, referring to FIG. 8 to FIG. 12. Here, for convenience, members of the present embodiment that have the same arrangement and function as members of the foregoing embodiments, and that are mentioned in those embodiments are indicated by the same reference numerals and description thereof is omitted.

When a user buys a new communication terminal 1, replacing the old communication terminal, and installs the software delivered to the old communication terminal, the software would not run due to difference in terminal types. For example, Supposing that the communication terminal is a mobile phone, the software may be not be compatible due to machine types (old/new) and changes of mobile phone service providers. If the communication terminal is a personal computer, the software may not be compatible due to different types of OSs (Operating System) and version differences of the same OS.

Accordingly, in the present embodiment, the communication terminal transmits identification information by which the communication terminal is identified and identification information by which a user of that communication terminal is identified to a server machine over a network. The server machine identifies delivered software in the delivery management database on the basis of the identification information by which the communication terminal and the user of the communication terminal are identified, determines software corresponding to the communication terminal, and delivers to the communication terminal over the network.

Here, for example, the information by which users are identified may be, for example, the users' account names and passwords, as well as telephone numbers and email addresses in the case of the communication terminal being a mobile phone. The information by which communication terminals are identified may be, for example, manufacture numbers, MAC (Media Access Control) addresses, and information about OSs and their versions.

The software delivery system of the present embodiment has a similar functional block arrangement to the software delivery system 5 in FIG. 1. Identical blocks are given the same reference numerals, and detailed description thereof is omitted.

FIG. 8 shows an example of registered information in the delivery management database 23 in the present embodiment. The following description will assume, as an example, software entitled "software 001 (X)" and "software 002 (X)" is delivered to a communication terminal "X."

As shown in FIG. 8, the delivery management database 23 contains, as the identification information, user information like "M" by which a user is identified and communication terminal information like "X" by which a communication terminal is identified. The database 23 contains software delivery history information software titles "software 001 (X)" and "software 002 (X)" with respect to the identification information. For example, FIG. 8 shows that software entitled software 001 (X) and software 002 (X) was delivered to the communication terminal X used by the user having the user information "M" as the identification information.

Figure 10:
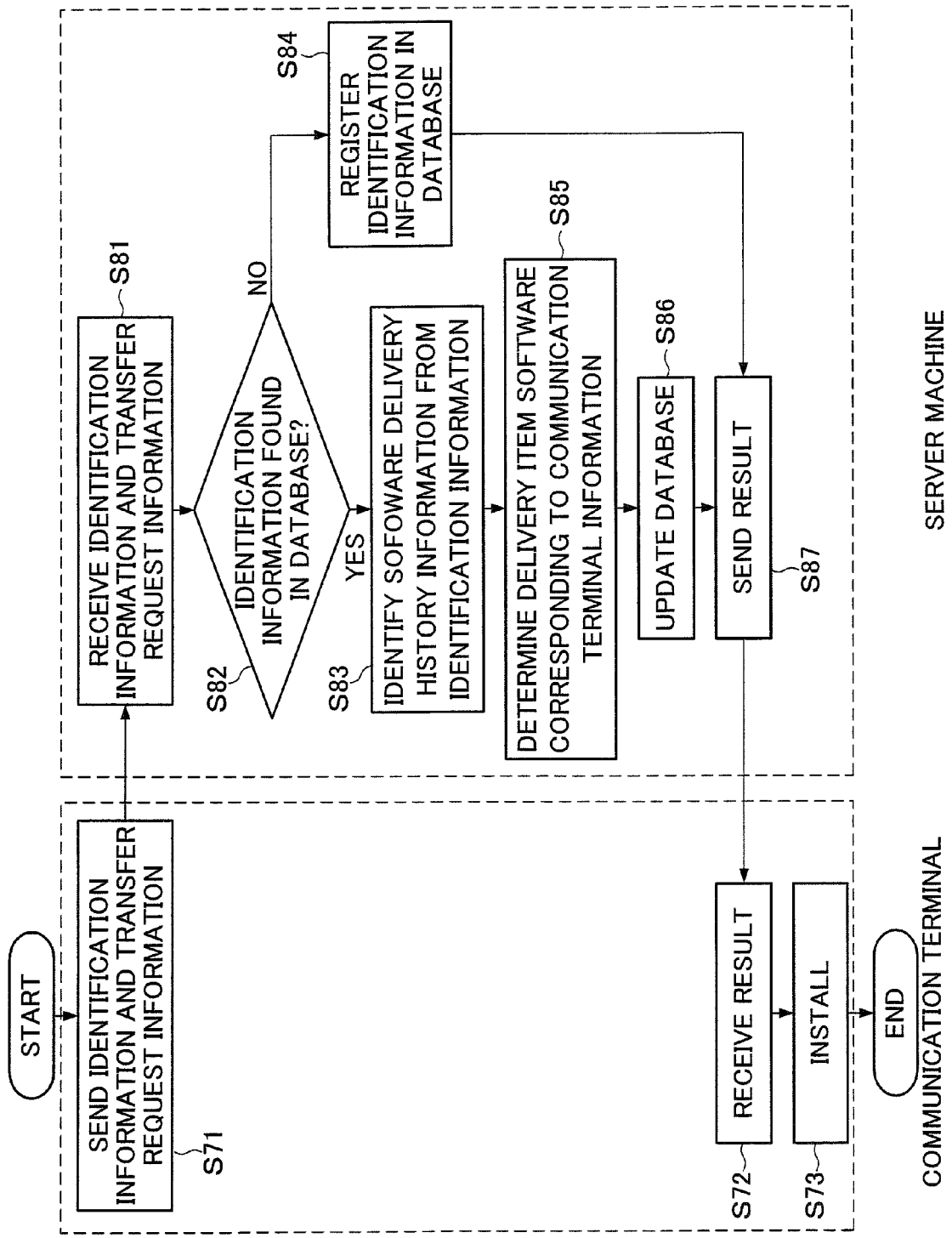
FIG. 10 is a flow chart illustrating, as an example, operation of a transmission request from a communication terminal in the software delivery system.

FIG. 10 is a flow chart illustrating the operation of the communication terminal 1 and the server machine 2 in the present embodiment. The operation is divided between the communication terminal 1 and the server machine 2 in FIG. 10.

First, the transfer request information transmitter section 124 in the communication terminal 1 sends transfer request information requesting a transmission of software desired by the user to the identification information transmitter section 122. On obtaining the transfer request information, the identification information transmitter section 122 obtains as the identification information the user information by which the user is identified and the communication terminal information by which the communication terminal is identified. Alternatively, the section 122 retrieves the identification information from the memory section 13. The identification information transmitter section 122 then transmits the transfer request information and the identification information to the server machine 2 through the communication section 21 and over the network 3 (step S71).

In the server machine 2, the information obtain section 221 receives the identification information and the transfer request information over the network and through the communication section 21 and sends the received identification information to the communication history information retrieve section 222 (step S81).

Next, the communication history information retrieve section 222 searches the delivery management database 23 for the received identification information (step S82).

If the delivery management database 23 does not contain the received identification information (NO in step S82), the communication history information retrieve section 222 sends the identification information and the software information to the new information write section 225. The new information write section 225 newly registers the received identification information and the software information (step S84).

In contrast, if the delivery management database 23 already has the received identification information registered therein (YES in step S82), the communication history information retrieve section 222 sends the received identification information and the transfer request information to the delivery item determine section 224. The delivery item determine section 224 determines the software corresponding to the communication terminal as delivery item software by referring to the transfer request information to examine the correspondence of information by which the software for which a transfer was requested from the communication terminal 1 and the communication terminal are identified, and retrieves the delivery item software from the software storage section 24 (step S85).

In this situation, the section 224 may determine, as the delivery item software, patches and updater software, if any, other than the software of which a transfer was requested by the communication terminal 1, but determined by the server machine 2 to be needed for new updates.

Next, the delivery item determine section 224 sends the information representing the determined delivery item software and the identification information to the update information write section 223. The update information write section 223 compares the information representing the delivery item software to the software delivery history information corresponding to the received identification information registered in the delivery management database 23. Here, new information is added. That is, the software delivery history information is updated (step S86).

The delivery item determine section 224 then transmits the delivery item software retrieved from the software storage section 24 to the communication terminal 1 corresponding to individual information through the communication section 21 and over the network 3 (step S87).

The updater software obtain section 121 receives the delivery item software from the server machine 2 (step S72) for transmission to the installer 123. The installer 123 installs the received software (step S73).

For example, let us assume that a user having identification information "user information M" buys a communication terminal Y with "communication terminal information Y," replacing the communication terminal X with "communication terminal information X."

First, in step S71 in FIG. 10, "the user information M" and "the communication terminal information Y" are transmitted from the communication terminal Y to the server machine 2 as the identification information.

Next, after steps S81, S82, the communication history information retrieve section 222 identifies the "software 001 (X)" and the "software 002 (X)" which is the software delivery history information corresponding to the identification information "user information M" from the delivery management database 23.

Further, in step S85, the delivery item determine section 224 examines correspondence between the software 001 (X) and software 002 (X) which are delivered software and the communication terminal information Y. Here, the software, software 001 (X) and software 002 (X), correspond to the communication terminal X. Therefore, the section 224 determines the software, software 001 (Y) and software 002 (Y), as the delivery item software as the software, corresponding to the communication terminal Y, which is capable of the same processing as the software, software 001 (X) and software 002 (X), and retrieves the software, software 001 (Y) and software 002 (Y), from the software storage section 24.

Next, in step S86, the update information write section 223 writes update information to the delivery management database 23. FIG. 9 corresponds to FIG. 8 and shows an example of registered information in the delivery management database 23 after an update. As shown in the figure, the user information M and the communication terminal information Y which are identification information, as well as the software 001 (Y) and software 002 (Y) which are the titles of the software to be delivered, are written to the delivery management database 23.

Next, in steps S87, S72, the software, software 001 (Y) and software 002 (Y), is transmitted from the server machine 2 to the communication terminal Y. In step S73, the communication terminal Y installs the software, software 001 (Y) and software 002 (Y).

As a result, even if the user changes communication terminals through a purchase for example, the user can immediately obtain the software he once obtained without paying attention to software compatibility with the old and new communication terminals. Therefore, even if the user changes communication terminals, for example, even when he changes mobile phones without changing the telephone number, the user can restore an identical software environment (e.g. downloaded ring tones and game software). In addition, when the user changes his personal computers running different operating systems or buys a personal computer with a newer version of the same OS, he can restore an identical software environment.

In addition, even if the user changes communication terminals and use one which is not compatible with the original software, the delivery management database 23 in the server machine 23 stores the information by which the communication terminal is identified and the delivery history information about delivered software. As a result, the software delivery history information in the delivery management database 23 is reliably updated, reflecting the latest information.

Incidentally, the user with identification information, "user information M," may for example buy a communication terminal Y with "communication terminal information Y" to replace the terminal Y with the communication terminal X with "communication terminal information X," and also replace old user information with "user information N." If, for example, the communication terminal is a mobile phone, and the user information is a telephone number, changing mobile phones may result in changing telephone numbers. If the communication terminal is a personal computer, and the user information is an email address, changes computers may result in changing email addresses.

FIG. 11 shows an example of registered information in the delivery management database 23 corresponding to the above case. As shown in the figure, the delivery management database 23 contains an user ID like "A" by which the user is identified in the present software delivery system 5, the user information like "M" used in another system to identify a user, and communication terminal information like "X" by which a communication terminal is identified, as the identification information. The database 23 contains software delivery history information like software titles, "software 001 (X)" and "software 002 (X)," with respect to the identification information. For example, FIG. 11 shows that software entitled software 001 (X) and software 002 (X) was delivered to a communication terminal X used by a user having "user ID: A" and "user information M" as the identification information.

Here, the "user ID: A" is, for example, the name of the user and a password, or other information by which individual users are identifiable. The "user information M" is information assigned to the user, for example, a telephone number or an email address.

Assume, for example, that a user having identification information, "user information M," buys a communication terminal Y with "communication terminal information Y," replacing a communication terminal X with "communication terminal information X," and changes from "user information M" to "user information N."

First, in step S71 in FIG. 10, the "user ID: A," "user information M," and "communication terminal information Y" are transmitted as identification information from the communication terminal Y to the server machine 2.

Next, after steps S81, S82, the communication history information retrieve section 222 identifies, in the delivery management database 23, "software 001 (X)" and "software 002 (X)" which is the software delivery history information corresponding to the identification information, "user ID: A."

Further, in step S85, the delivery item determine section 224 examines the correspondence between software 001 (X) and software 002 (X) which is delivered software and the communication terminal information Y. Here, the software, software 001 (X) and software 002 (X), is software corresponding to the communication terminal X. Therefore, the section 224 determines the software, software 001 (Y) and software 002 (Y), as the delivery item software as the software, corresponding to the communication terminal Y, which is capable of the same processing as the software, software 001 (X) and software 002 (X), and retrieves the software, software 001 (Y) and software 002 (Y), from the software storage section 24.

Next, in step S86, the update information write section 223 writes update information to the delivery management database 23. FIG. 12 corresponding to FIG. 11 and shows an example of registered information in the delivery management database 23 after an update. As shown in the figure, the "user ID: A," "user information N," and "communication terminal information Y" which are the identification information, as well as software 001 (Y) and software 002 (Y) which are titles of the software to be delivered, are written to the delivery management database 23.

Next, in steps S87, S72, the software, software 001 (Y) and software 002 (Y), are transmitted from the server machine 2 to the communication terminal Y. In step S73, the communication terminal Y installs the software, software 001 (Y) and software 002 (Y).

As a result, even if the user changes both communication terminals and telephone numbers through a purchase for example, the user can immediately obtain the software he once obtained without paying attention to software compatibility with the old and new communication terminals. In addition, the user information in the delivery management database 23, that is, the telephone number, email address, or like information, is changed. The user can use the new telephone number and email address as the identification information in subsequent processes.

As in the foregoing, the content delivery server of the present embodiment is the server machine 2 delivering software to one or more communication terminals over the network 3. The content delivery server includes the communication section 21 communicating with the communication terminal(s) and a storage device storing information. The storage device stores the delivery management database 23 containing the correspondence relationship between the identification information by which users and communication terminals are identified and the delivered software which is software already delivered to the user corresponding to the identification information. Further, the content delivery server includes: the communication history information retrieve section 222 retrieving the delivery management database 23 from the storage means and identifying the delivered software corresponding to the identification information from the retrieved delivery management database 23; and the delivery item determine section 224 examining correspondence between the delivered software identified by the communication history information retrieve section 222 and the communication terminal used by the user corresponding to the identification information, determining delivery item software, and delivering the software to the communication terminal.

According to the arrangement, when re-delivering delivered software to the user, the delivery item determine section 224 delivers the delivered software corresponding to the identification information to the communication terminal being used by the user corresponding to the identification information through the communication section 21 and over the network 3 based on the delivery management database 23 retrieved by the communication history information retrieve section 222.

As a result, the delivered software is identifiable for each user even when a plurality of communication terminal are connected to the server machine 2. The user can obtain the delivered software to the user in a single delivery even when he has changed communication terminals.

Therefore, the user can obtain the software corresponding to the delivered software once delivered even if the user has changed communication terminals. The user can restore the same environment after changing communication terminals.

The components of the control sections 12, 12' in the communication terminals 1, 1' and the delivery sections 22, 22' in the server machines 2, 2' of the embodiments, as well as the process steps, may be implemented by controlling a keyboard or other input means, a display or other output means, or an interface circuit or other communication means with a CPU or other compute means executing computer programs recorded in ROM (Read Only Memory), RAM, or other storage means. Therefore, the various functions of the server machine 2 of the embodiment and the server machine 2', as well as various process steps, are implemented by a computer equipped with the various means simply reading a storage medium containing the program for execution of the program. In addition, the various functions and process steps are implemented on a given computer by recording the program on a removable storage medium.

The storage medium may be a memory (not shown) for process steps on a microcomputer. For example, something like a ROM may be a program medium. Alternatively, the program medium may be such that a program reader device (not shown) as an external storage device may be provided in which a storage medium is inserted for reading.

In addition, in any case, the stored program is preferably executable on access by a microprocessor. Further, it is preferred if the program is retrieved, and the retrieved program is downloaded to a program storage area in a microcomputer to execute the program. The download program is stored in a main body device in advance.

In addition, the program medium may be a storage medium constructed separately from a main body. The medium may be tape based, such as a magnetic tape or cassette tape; disc based, such as a flexible disc or hard disk including a magnetic disc and CD/MO/MD/DVD; card based, such as an IC card (including a memory card); or a semiconductor memory, such as a mask ROM, EPROM (Erasable Programmable Read Only Memory), EEPROM (Electrically Erasable Programmable Read Only Memory), and a flash ROM. All these types of media hold the program in a fixed manner.

In contrast, if the system is arranged to connect to the Internet or another communication network, the medium is preferably a storage medium which holds the program in a flowing manner so that the program can be downloaded over the communication network.

Further, if the program is downloaded over a communication network in this manner, it is preferred if the download program is either stored in a main body device in advance or installed from another storage medium.

Various embodiments of the invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

In addition, an embodiment of the present invention enables a single delivery of all delivered content which was previously delivered, even if the user changes the configuration of the communication terminal or changes communication terminals. The invention is therefore applicable to nodes on various communication networks when the configuration of the nodes is changed.

As in the foregoing, a content delivery server in accordance with the present invention delivers content to at least one communication terminal over a communication network, and is characterized in that the server includes:

communication means communicating with the communication terminal; and storage means storing information, wherein the storage means stores delivery management information representing a correspondence relationship between (a) identification information by which the communication terminal is identified and/or identification information by which a user of that communication terminal is identified and (b) delivered content which is content already delivered to a communication terminal corresponding to the identification information, the content delivery server further including:

identifying means retrieving the delivery management information from the storage means to identify delivered content corresponding to the identification information based on the retrieved delivery management information; and delivery means delivering the delivered content identified by the identifying means to the communication terminal corresponding to the identification information.

According to the arrangement, the storage means stores delivery management information representing a correspondence relationship between (a) identification information by which the communication terminal is identified and/or identification information by which a user of that communication terminal is identified and (b) delivered content which is content already delivered to a communication terminal corresponding to the identification information.

To re-deliver the delivered content to the communication terminal or a communication terminal being used by the user, the delivery means delivers the delivered content corresponding to the identification information to a communication terminal corresponding to the identification information through the communication means and over the communication network based on the delivery management information retrieved by the identifying means.

Thus, in an environment where a plurality of communication terminals are connected to the content delivery server, delivered content can be identified for each user or communication terminal, allowing the user or communication terminal to receive delivered content directed to that user or communication terminal in a single delivery.

Therefore, for example, when the content is software, and the user is to reinstall software, because the user can obtain in a single delivery the delivered software which was delivered previously, the user can restore the environment when updater software was installed for the last time before the reinstallation.

Another content delivery server in accordance with an embodiment of the present invention includes the foregoing arrangement, and is characterized in that the server further includes information obtaining means obtaining the identification information from the communication terminal, wherein the identifying means identifies the delivered content corresponding to the identification information obtained by the information obtaining means.

According to the arrangement, the content delivery server, upon obtaining identification information, can deliver the delivered content a communication terminal corresponding to the identification information. Therefore, the delivered content can be more efficiently delivered to the communication terminal being used by the user who wants to have the delivered content delivered.

Therefore, for example, when the content is software, and the user is to reinstall original software, because the user can immediately obtain the delivered software by the communication terminal transmitting the identification information to the content delivery server, the user can reinstall the original software and install the delivered content at the same time. The user can thus immediately restore the software environment when updater software was installed for the last time before the reinstallation.

Another content delivery server in accordance with an embodiment of the present invention includes the foregoing arrangement, and is characterized in that the server further includes new registration means which, if the identification information obtained by the information obtaining means is new identification information not contained in the delivery management information stored in the storage means, performs a new registration to the delivery management information by writing the new identification information to the storage means so that the new identification information is added to the delivery management information.

According to the arrangement, the new registration means adds the new identification information to the delivery management information. Thus, when content is delivered to a communication terminal corresponding to the identification information, the delivery management information is updated so as to establish a correspondence relationship between the identification information and the delivered content.

Another content delivery server in accordance with an embodiment of the present invention includes the foregoing arrangement, and is characterized in that: the delivery management information further includes a correspondence relationship between the identification information and delivery time information representing a delivery time of the delivered content; and the identifying means identifies the identification information such that a predetermined period has elapsed since the delivery time and the delivered content corresponding to the identification information, based on the delivery management information.

According to the arrangement, the communication terminal can obtain the delivered content through regular delivery from the content delivery server. The regular backups of the delivered content can be readily automatically performed by automatic backups in synchronism with the regular deliveries. Therefore, the user can retrieve the backed-up delivered content, without having to request a redelivery to the content delivery server, when he wants to reobtain the delivered content.

Another content delivery server in accordance with an embodiment of the present invention includes the foregoing arrangement, and is characterized in that the delivery means further delivers additional content other than the delivered content to the communication terminal.

According to the arrangement, the content delivery server can deliver the latest content which the user or the communication terminal has not obtained yet. Thus, the user can utilize the latest content.

Another content delivery server in accordance with an embodiment of the present invention includes the foregoing arrangement, and is characterized in that the server further includes update means which, if the delivery means has delivered the additional content, updates the delivery management information by adding information on the delivered additional content to information on the delivered content corresponding to the identification information corresponding to a delivery destination.

According to the arrangement, the information representing the delivered content contained in the delivery management information is kept updated, reflecting the latest information. Thus, the delivery management information contains all delivered content corresponding to the identification information. Therefore, the content delivery server can surely redeliver all the delivered content up to the delivered content which was delivered the last time.

Another content delivery server in accordance with an embodiment of the present invention includes the foregoing arrangement, and is characterized in that the delivered content is correction content which corrects certain content.

According to the arrangement, the user can correct inconveniences in certain content using the correction content.

Another content delivery server in accordance with an embodiment of the present invention includes the foregoing arrangement, and is characterized in that: the identification information includes communication terminal information by which the communication terminal is identified and user information by which the user of the communication terminal is identified; and the identifying means retrieves the delivery management information corresponding to the user information in the identification information obtained by the information obtaining means from the storage means to identify content corresponding to the communication terminal information in the identification information obtained by the information obtaining means as the delivered content based on the retrieved delivery management information.

According to the arrangement, when the user changes communication terminals through, for example, a purchase, the delivery management information is retrieved on the basis of the user information to identify the content corresponding to the communication terminal information as delivered content. Therefore, the user can immediately obtain the software he once obtained without paying attention to software compatibility with the communication terminals.

Another content delivery server in accordance with an embodiment of the present invention includes the foregoing arrangement, and is characterized in that the server further includes terminal information update means updating the communication terminal information in the delivery management information, stored in the storage means, which corresponds to the user information to the communication terminal information in the identification information obtained by the information obtaining means.

According to the arrangement, when communication terminals are changed, the communication terminal information in the delivery management information is updated. Therefore, only the communication terminal information can thereafter be utilized as the identification information.

Another content delivery server in accordance with an embodiment of the present invention includes the foregoing arrangement, and is characterized in that the user information includes user inside information which is user information identified by the content delivery server and user outside information which is user information identified by another device, the content delivery server further including user information update means updating the user outside information in the delivery management information, stored in the storage means, which corresponds to the user inside information to the user outside information in the identification information obtained by the information obtaining means.

Here, the user inside information may be, for example, the user account name and password. In addition, the user outside information may he, for example, a telephone number and email address if the communication terminal is a mobile phone.

According to the arrangement, the delivery management information is retrieved on the basis of the user inside information to identify the content corresponding to the communication terminal information as the delivered content, even if the user changes both communication terminals and the user outside information through a purchase for example. Therefore, the user can immediately obtain the content he once obtained without paying attention to software compatibility with the communication terminals. In addition, the user outside information in the delivery management information is updated. Afterwards, the user outside information can therefore be utilized as the identification information without utilizing the user inside information.

A communication terminal in accordance with an embodiment of the present invention receives content from a content delivery server over a communication network, and is characterized in that the terminal includes:

communication means communicating with the content delivery server;

identification information transmitter means obtaining identification information by which the communication terminal is identified and/or identification information by which a user of the communication terminal is identified, to transmit the identification information to the content delivery server through the communication means and over the communication network; and content obtaining means obtaining delivered content over the communication network and through the communication means by the identification information transmitter means transmitting the identification information to the content delivery server, the delivered content being content already received by the communication terminal or a communication terminal being used by the user.

According to the arrangement, the communication terminal can obtain in a single delivery the delivered content already delivered to that terminal or a communication terminal being used by the user by simply transmitting the identification information to the content delivery server. Therefore, for example, when the content is software, and the user is to reinstall software, because the user can obtain in a single delivery the delivered software which was delivered previously, the user can restore the environment when updater software was installed for the last time before the reinstallation.

Another communication terminal in accordance with an embodiment of the present invention includes the foregoing arrangement, and is characterized in that: the identification information transmitter means includes content request transmitter means transmitting information requesting a transmission of content along with the identification information to the content delivery server through the communication means and over the communication network; and the content request transmitter means obtains the content requested by the content obtaining means by transmitting the information.

According to the arrangement, a request can be made to content delivery server to have content other than the delivered content transmitted. The content can be readily obtained. Thus, the user can use the communication terminal in a desired content environment.

Another communication terminal in accordance with an embodiment of the present invention includes the foregoing arrangement, and is characterized in that the terminal further includes storage medium reader means reproducing certain content from a storage medium, wherein the delivered content obtained by the content obtaining means is correction content correcting the content reproduced by the storage medium reader means.

According to the arrangement, the communication terminal, when reobtaining content from a storage medium, can reobtain correction content for obtained content. Thus, the original content, which contains a large amount of data, is obtained from a storage medium, and the correction content, which contains a small amount of data, is obtained over a communication network. Communication workload is reduced. The original content and the correction content can be more readily reobtained.

Another communication terminal in accordance with an embodiment of the present invention includes the foregoing arrangement, and is characterized in that the identification information is at least one of an ID number of the user, an ID number of the communication terminal, an ID number of the content reproduced by the storage medium reader means, and an ID number of the storage medium containing the content.

In the arrangement, when using the ID number of the user, the user can assign identical identification information to all communication terminals he uses. Therefore, the delivered content delivered to one of the terminals can be installed from the content delivery server to the other communication terminals. Thus, all the communication terminal being used by the user can share an identical content environment.

In addition, when using the ID number of the communication terminal, the ID number of the content reproduced by the storage medium reader means, or the ID number of the storage medium containing the content, the user does not bother to enter the ID number.

Further, when using the ID number of the communication terminal, content environment can be varied from one communication terminal to the other. In addition, when using the ID number of the content, since the identification information contains content information, the content delivery server can easily search for content to be delivered which corresponds to the content.

Another communication terminal in accordance with an embodiment of the present invention includes the foregoing arrangement, and is characterized in that: the identification information includes communication terminal information by which the communication terminal is identified and user information by which the user of the communication terminal is identified; and the content obtaining means obtains content corresponding to the communication terminal information in the identification information, regarding delivered content already obtained at another terminal by the user of the user information in the identification information transmitted by the identification information transmitter means.

According to the arrangement, when the user changes communication terminals through, for example, a purchase, content corresponding to the communication terminal information is obtained regarding the delivered content already obtained by the user of the user information at another terminal. Therefore, the user can immediately obtain the content he once obtained without paying attention to software compatibility with the communication terminals.

A content delivery system in accordance with an embodiment of the present invention is characterized in that the content delivery server is connected to the communication terminal over a communication network.

In the content delivery system of this arrangement, similar operation and effects can be realized as with the aforementioned content delivery server and communication terminal.

In addition, a content deliver method in accordance with an embodiment of the present invention is a content deliver method of delivering content from a content delivery server to a communication terminal, the content delivery server including storage means storing information, the storage means storing delivery management information representing a correspondence relationship between (a) identification information by which the communication terminal is identified and/or identification information by which a user of that communication terminal is identified and (b) delivered content which is content already delivered to a communication terminal corresponding to the identification information, said method including the steps of:

the communication terminal obtaining the identification information by which the communication terminal is identified and/or the identification information by which the user of the communication terminal is identified;

the communication terminal transmitting the obtained identification information to the content delivery server;

the content delivery server retrieving the delivery management information from the storage means to identify delivered content corresponding to the identification information transmitted from the communication terminal based on the retrieved delivery management information; and the content delivery server delivering the identified delivered content to the communication terminal which has transmitted the identification information.

According to the method, in an environment where a plurality of communication terminals are connected to the server machine, delivered content can be identified for each user or communication terminal, allowing the user or communication terminal to receive delivered content directed to that user or communication terminal in a single delivery.

Therefore, for example, when the content is software, and the user is to reinstall the content, because the user can obtain in a single delivery the delivered software which was delivered previously, the user can restore the environment when updater software was installed for the last time before the reinstallation.

The identifying means and the delivery means in the content delivery server can be implemented by a content delivery program on a computer. In addition, the identification information transmitter means and the content obtaining means in the communication terminal can be implemented by a terminal control program on a computer. Further, by storing the content delivery program and/or the terminal control program on a computer-readable storage medium, the content delivery program can be executed on a given computer.

As in the foregoing, the content delivery server in accordance with an embodiment of the present invention stores delivery management information representing a correspondence relationship between identification information and delivered content already delivered to a communication terminal corresponding to the identification information, and when the delivered content is to be redelivered, delivers the delivered content corresponding to the identification information to a communication terminal corresponding to the identification information based on retrieved delivery management information. Therefore, in an environment where a plurality of communication terminals are connected to the content delivery server, delivered content can be identified for each user or communication terminal, allowing the user or communication terminal to receive delivered content directed to that user or communication terminal in a single delivery.

What is claimed is:

1. A communication terminal receiving content from a content delivery server over a communication network, comprising:

a communication device communicating with the content delivery server;

an identification information transmitter section transmitting (i) terminal identification information by which the communication terminal is identified, (ii) user identification information by which a user of the communication terminal is identified, and (iii) content identification information of obtained content to the content delivery server through the communication device and over the communication network; and a content obtaining section obtaining content from the content delivery server over the communication network and through the communication device, the identification information transmitter section transmitting, to the content delivery server, (i) the terminal identification information, (ii) the user identification information, and (iii) content identification information of content which is already received by another communication terminal used by the user who has been identified by the user identification information, and the content obtaining section obtaining, from the content delivery server, updater content which (i) is used to update the content identified by the content identification information and (ii) corresponds to said communication terminal.

2. The communication terminal as set forth in claim 1, wherein:

the identification information transmitter section includes a content request transmitter section transmitting information requesting a transmission of content along with the terminal identification information, the user identification information, and the content identification information, to the content delivery server through the communication device and over the communication network; and the content obtaining section obtains the content thus requested, by the content request transmitter section transmitting the information.

3. The communication terminal as set forth in claim 1, further comprising a storage medium reader device reproducing certain content from a storage medium,
wherein the content obtained by the content obtaining section is updater content for updating the certain content reproduced by the storage medium reader device.

4. A content delivery server delivering content to at least one communication terminal over a communication network, comprising:
a communication device communicating with the communication terminal;
a storage device storing information, wherein the storage device stores delivery management information representing a correspondence relationship between (a) terminal identification information by which the communication terminal is identified, (b) user identification information by which a user of that communication terminal is identified, and (c) content identification information by which delivered content is identified, the delivered content being content already delivered to a communication terminal corresponding to the terminal identification information and received by the communication terminal:
an information obtaining section obtaining the terminal identification information, the user identification information, and the content identification information from the communication terminal;
an identifying section retrieving the delivery management information from the storage device, to identify terminal identification information and content identification information each corresponding to the user identification information obtained by the information obtaining section, based on the retrieved delivery management information; and
a delivery section delivering updater content, which is used to update the delivered content identified by the content identification information identified by the identifying section and which corresponds to the terminal identification information obtained by the information obtaining section, to the communication terminal.

5. The content delivery server as set forth in claim 4, further comprising a new registration section which, when the user identification information obtained by the information obtaining section is new user identification information not contained in the delivery management information stored in the storage device, performs a new registration to the delivery management information by writing the terminal identification information and user identification information obtained by the information obtaining section to the storage device so that the terminal identification information and user identification information obtained by the information obtaining section is added to the delivery management information.

6. The content delivery server as set forth in claim 4, further comprising a terminal information update section updating the terminal identification information in the delivery management information, stored in the storage device, which corresponds to the user identification information obtained by the information obtaining section.

7. A content delivery system in which a content delivery server is connected to at least one communication terminal over a communication network,
said content delivery server comprising:
a communication device communicating with the communication terminal;
a storage device storing information, wherein the storage device stores delivery management information representing a correspondence relationship between (a) terminal identification information by which the communication terminal is identified, (b) user identification information by which a user of that communication terminal is identified, and (c) content identification information by which delivered content is identified, the delivered content being content already delivered to a communication terminal corresponding to the terminal identification information and received by the communication terminal;
an information obtaining section obtaining the terminal identification information, the user identification information, and the content identification information from the communication terminal;
an identifying section retrieving the delivery management information from the storage device, to identify terminal identification information and content identification inforniation each corresponding to the user identification information obtained by the information obtaining section, based on the retrieved delivery management information; and
a delivery section delivering updater content, which is used to update the delivered content identified by the content identification information identified by the identifying section and which corresponds to the terminal identification information obtained by the information obtaining section, to the communication terminal,
each of said at least one communication terminal comprising:
a communication device communicating with the content delivery server;
an identification information transmitter section transmitting (i) terminal identification information by which the communication terminal is identified, (ii) user identification information by which a user of the communication terminal is identified, and (iii) content identification information of obtained content to the content delivery server through the communication device and over the communication network; and
a content obtaining section obtaining content from the content delivery server over the communication network and through the communication device,
the identification information transmitter section transmitting, to the content delivery server, (i) the terminal identification information, (ii) the user identification information, and (iii) content identification information of content which is already received by another communication terminal used by the user who has been identified by the user identification information, and
the content obtaining section obtaining, from the content delivery server, updater content which (i) is used to update the content identified by the content identification information and (ii) corresponds to said communication terminal.

* * * * *